(12) United States Patent
Buckner

(10) Patent No.: US 7,460,979 B2
(45) Date of Patent: Dec. 2, 2008

(54) METHOD AND SYSTEM FOR ENHANCED RESOLUTION, AUTOMATICALLY-CALIBRATED POSITION SENSOR

(75) Inventor: Zachary Buckner, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 293 days.

(21) Appl. No.: 10/578,858

(22) PCT Filed: Nov. 22, 2004

(86) PCT No.: PCT/US2004/039380

§ 371 (c)(1),
(2), (4) Date: May 11, 2006

(87) PCT Pub. No.: WO2005/053146

PCT Pub. Date: Jun. 9, 2005

(65) Prior Publication Data

US 2007/0055461 A1    Mar. 8, 2007

Related U.S. Application Data

(60) Provisional application No. 60/523,648, filed on Nov. 20, 2003.

(51) Int. Cl.
*G01C 9/00* (2006.01)
*G06F 15/00* (2006.01)

(52) U.S. Cl. .................................... 702/151

(58) Field of Classification Search .................. 702/36, 702/151
See application file for complete search history.

(56) References Cited

U.S. PATENT DOCUMENTS

| | | | |
|---|---|---|---|
| 3,956,973 | A | 5/1976 | Pomplas |
| 4,587,485 | A | 5/1986 | Papiernik |
| 4,630,928 | A | 12/1986 | Klingler |
| 4,728,193 | A | 3/1988 | Bartelt |
| 4,923,301 | A | 5/1990 | White |
| 4,972,080 | A | 11/1990 | Taniguchi |
| 5,012,239 | A | 4/1991 | Griebeler |
| 5,041,784 | A | 8/1991 | Griebeler |
| 5,067,089 | A | 11/1991 | Ishii |
| 5,442,313 | A | 8/1995 | Santos |
| 5,719,789 | A | 2/1998 | Kawamata |

(Continued)

FOREIGN PATENT DOCUMENTS

EP    0840096    6/1998

OTHER PUBLICATIONS

Buckner, A Thesis "Enhanced Resolution Quadrature Encoder Interface" Nov. 17, 2004.

*Primary Examiner*—Michael P. Nghiem
*Assistant Examiner*—Cindy H Khuu
(74) *Attorney, Agent, or Firm*—Robert J. Decker

(57) ABSTRACT

A system and method for sensing position and/or displacement of a moving, substrate, ram, target, piston, encoder wheel or the like. The system includes a plurality of transducers for generating two sinusoidal signals in quadrature related to the position and displacement of the substrate, ram or the like. Alternatively, the sinusoidal signals may be generated by other well-known devices, such as by an optical encoder or the like. The two sinusoidal signals in quadrature are processed to provide enhanced resolution compared to conventional quadrature systems. The system is also capable of self-calibration in order to accommodate fluctuations in the two sinusoidal signals in quadrature.

108 Claims, 5 Drawing Sheets

U.S. PATENT DOCUMENTS

| | | | |
|---|---|---|---|
| 5,859,707 A | 1/1999 | Nakagawa | |
| 5,867,021 A * | 2/1999 | Hancock | 324/207.2 |
| 6,084,234 A | 7/2000 | Stridsberg | |
| 6,167,108 A | 12/2000 | Nakano | |
| 6,172,359 B1 | 1/2001 | Stridsberg | |
| 6,191,415 B1 | 2/2001 | Stridsberg | |
| 6,232,739 B1 | 5/2001 | Krefta | |
| 6,294,910 B1 * | 9/2001 | Travostino et al. | 324/207.25 |
| 6,456,063 B1 | 9/2002 | Moreno | |
| 6,459,261 B1 | 10/2002 | Luetzow | |
| 6,518,897 B1 | 2/2003 | Bradford | |
| 6,556,153 B1 | 4/2003 | Cardamone | |
| 6,573,710 B1 | 6/2003 | Santos | |
| 6,630,659 B1 | 10/2003 | Stridsberg | |
| 6,975,112 B2 | 12/2005 | Morys | |
| 2004/0080491 A1 * | 4/2004 | Takatsuka et al. | 345/156 |

* cited by examiner

METHOD AND SYSTEM FOR ENHANCED RESOLUTION, AUTOMATICALLY-CALIBRATED POSITION SENSOR

CROSS REFERENCE TO RELATED APPLICATIONS

This application is a national stage filing of International Application No. PCT/US2004/039380, filed on Nov. 22, 2004, which claims priority from U.S. Provisional Application Ser. No. 60/523,648, filed Nov. 20, 2003, entitled "Method, System, and Computer Program for Enhanced Resolution, Automatically-Calibrated Magnetic Position Sensor," the entire disclosures of which are hereby incorporated by reference herein in their entirety.

BACKGROUND OF THE INVENTION

Sensors for detecting position and displacement are often used in many mechanical processes in which it is important to position and/or move a ram, or the like, axially under precise control. It is well known in the art that signals containing information related to the position and displacement of a moving ram can be generated by mounting transducers in close proximity to the ram and outfitting the ram with equally-spaced magnetic bands disposed circumferentially around the girth of the ram. It is common for such systems to employ two transducers mounted in close proximity to the ram such that when the ram moves, the bands of magnetic material pass by the transducers thereby generating sinusoidal output voltages at the transducers. Traditionally, the two transducers are positioned precisely in respect to each other such that the two sinusoidal output signals are in quadrature (i.e., the transducer output signals are 90 degrees out of phase). Conversion of the two sinusoidal signals in quadrature into corresponding digital pulse trains, wherein each pulse corresponds to the passage of a magnetic band, yields meaningful information related to the position and displacement of the ram. Each pulse train changes state twice, once for each time the corresponding sinusoidal output signal crosses zero, over one period from one magnetic band to the next. Due to the fact that the pulse trains are 90 degrees out of phase, four state changes occur per period. It is well known in the art that the pattern of the state changes of the pulse trains reveals information related to the position and displacement of the ram. However, because there are only four discernible state changes per period, the resolution of such systems is limited and often proves inadequate.

Numerous systems and techniques for enhancing the resolution of conventional quadrature position and displacement sensors are known. However, these systems and techniques are plagued by a number of infirmities. For instance, many known systems for enhancing resolution require long chains of costly analog electronic circuitry. In addition to increasing cost, the elaborate analog circuitry required by such systems increases the systems' sensitivity to electromagnetic noise, distortion, and other environmental disturbances. Furthermore, many known systems for enhancing resolution often require the size and the complexity of the circuitry to scale proportionately with the desired increase in resolution. In other words, in order to double the resolution of the system, it is necessary to double the size and complexity of the circuitry. Moreover, a number of known systems for enhancing resolution cannot handle changes in the amplitude of the transducer output signals and consequently require manual calibration of analog circuit components like potentiometers. Finally, numerous known systems rely on lengthy, difficult, and costly digital operations such as digital division operations.

There is therefore a need in the art for a simple and efficient method and system of sensing the position and displacement of a moving substrate, ram or the like that provides, among other things, enhanced resolution and is capable of self-calibration.

BRIEF SUMMARY OF THE INVENTION

According to one aspect of the invention, a system for sensing position and/or displacement of a moving ram, substrate, target, piston or optical encoder is provided in which multiple state changes are generated in two quadrature signals, such that the state changes correspond to discreet locations within the interval between two magnetic bands or respective apertures of an optical encoder wheel, for example.

In accordance with this aspect of an embodiment of the invention, the ram, substrate, piston, or target is outfitted with a plurality of equally-spaced bands of magnetic material disposed circumferentially around the girth of the ram or place as required or desired, or alternatively apertures are provided on an optical wheel or the like. Further in accordance with this aspect of the invention, a first signal acquisition means for acquiring a first signal related to the position of the ram and a second signal acquisition means for acquiring a second signal related to the position of the ram that is 90 degrees out of phase with the first signal related to the position of the ram is provided. Still further in accordance with this aspect of the invention, a signal selection means is provided for comparing the first signal related to the position of the ram and the second signal related to the position of the ram, selecting the signal with the lesser instantaneous magnitude as the primary signal, selecting the signal with the greater instantaneous magnitude as the secondary signal, and producing a reference signal indicating whether the first signal related to the position of the ram or the second signal related to the position of the ram was selected as the primary signal. Yet further in accordance with this aspect of the invention, a phase angle converter means is provided for converting the primary signal into a phase angle signal. Still further in accordance with this aspect of the invention, an angular movement detection means is provided for determining angular movement over time based on the value of the phase angle signal over time.

Yet further in accordance with this aspect of an embodiment of the invention, the phase angle converter means includes a signal normalizing means for producing a normalized position signal by mapping the primary signal to a corresponding signal with a known amplitude; a phase angle lookup means for converting the normalized position signal into an uncorrected phase angle signal corresponding to the instantaneous phase angle of the normalized position signal; and a phase translation means for producing a phase angle signal by correcting the phase angle signal based on the values of the secondary signal and the reference signal.

Still further in accordance with an aspect of an embodiment of the invention, the angular movement detection means includes a phase register means for storing the phase angle signal and outputting a previous iteration phase angle signal equal to the phase angle signal and a phase subtractor means for producing an uncorrected angular movement signal by subtracting the previous iteration phase angle signal from the phase angle signal. Yet further in accordance with this aspect of the invention, the angular movement detection means also includes an overflow corrector means for correcting the uncorrected angular movement signal in the case of an overflow or underflow and producing the angular movement signal.

Still further in accordance with an aspect of an embodiment of the invention, the first signal acquisition means includes a first transducer and a second transducer mounted in close proximity to the ram such that when the ram moves the plurality of bands of magnetic material disposed circumferentially around the girth of the ram pass the transducers and thereby generate sinusoidal output signals at each transducer. Yet further in accordance with this aspect of the invention, the two transducers are positioned linearly with respect to each other and are spaced such that the distance between the first transducer and the second transducer is one-half of the distance between two adjacent bands of magnetic material disposed circumferentially around the girth of the ram. Consequently, the first transducer output signal is 180 degrees out of phase with the second transducer output signal.

Still further in accordance with an aspect of an embodiment of the invention, the second signal acquisition means includes a third transducer and a fourth transducer mounted in close proximity to the ram such that when the ram moves the plurality of bands of magnetic material disposed circumferentially around the girth of the ram pass the transducers and thereby generate sinusoidal output signals at each transducer. Yet further in accordance with this aspect of the invention, the two transducers are positioned linearly with respect to each other and are spaced such that the distance between the third transducer and the fourth transducer is one-half of the distance between two adjacent bands of magnetic material disposed circumferentially around the girth of the ram. Consequently, the third transducer output signal is 180 degrees out of phase with the fourth transducer output signal. Still further in accordance with this aspect of the invention, the third transducer is located between the first transducer and the second transducer, and the distance between the third transducer and the first transducer and the distance between the third transducer and the second transducer is one-quarter of the distance between two adjacent bands of magnetic material disposed circumferentially around the girth of the ram. Yet further in accordance with this aspect of the invention, the distance between the fourth transducer and the first transducer is three-quarters of the distance between two adjacent bands of magnetic material disposed circumferentially around the girth of the ram, and the distance between the fourth transducer and the second transducer is one-quarter of the distance between two of the adjacent bands of magnetic material disposed circumferentially around the girth of the ram.

Still further in accordance with an aspect of an embodiment of the invention, the first signal acquisition means also includes a first signal combining means for producing a first combined signal by subtracting the second transducer output signal from the first transducer output signal and amplifying the resulting signal; a first analog-to-digital converter for producing the first signal related to the position of the ram by converting a first calibrated signal into a digital signal; a first averaging means for producing a first digital error signal by performing a time-average of the first signal related to the position of the ram and subtracting the time-average of the first signal related to the position of the ram from the value of the direct current offset required by the first analog-to-digital converter; a first digital-to-analog converter for converting the first digital error signal into a first analog error signal; and a first subtractor means for producing the first calibrated signal by subtracting the first analog error signal from the first combined signal.

Yet further in accordance with an aspect of an embodiment of the invention, the second signal acquisition means also includes a second signal combining means for producing a second combined signal by subtracting the fourth transducer output signal from the third transducer output signal and amplifying the resulting signal; a second analog-to-digital converter for producing the second signal related to the position of the ram by converting a second calibrated signal into a corresponding digital signal; a second averaging means for producing a second digital error signal by performing a time-average of the second signal related to the position of the ram and subtracting the time-average of the second signal related to the position of the ram from the value of the direct current offset required by the second analog-to-digital converter; a second digital-to-analog converter for converting the second digital error signal into a second analog error signal; and a second subtractor means for producing the second calibrated signal by subtracting the second analog error signal from the second combined signal.

Still further in accordance with an aspect of an embodiment of the invention, the first signal combining means and the second signal combining means are differential amplifiers.

Yet further in accordance with an aspect of an embodiment of this invention, a traditional quadrature output emulating means is provided for converting the angular movement signal into traditional quadrature output signals.

Still further in accordance with an aspect of an embodiment of the invention the signal normalizing means computes the amplitude of the primary signal, and maps the primary signal to a corresponding sinusoidal signal with known amplitude. Yet further in accordance with this aspect of the invention, the calculation of the amplitude of the primary signal and the mapping of the primary signal to a corresponding signal with known amplitude is facilitated by the use of a lookup table.

Still further in accordance with an aspect of an embodiment of the invention, the phase angle lookup means determines the instantaneous phase angle of the normalized position signal using a lookup table.

Yet further in accordance with an aspect of an embodiment of the invention, the traditional quadrature output signals are controlled using a simple finite state machine.

Still further in accordance with an aspect of an embodiment of the invention, the first transducer, the second transducer, the third transducer, and the fourth transducer are Hall-effect sensors.

Yet further in accordance with an aspect of an embodiment of the invention, the signal selection means, the signal normalizing means, the phase angle lookup means, the phase translation means, the phase register means, the phase subtractor means, the overflow corrector means, the traditional quadrature output emulating means and the simple finite state machine are implemented in software in a digital controller.

According to a second aspect of the invention, a method for sensing position and/or displacement of a moving ram, substrate or the like is provided in which multiple state changes are generated in two quadrature signals, such that the state changes correspond to discreet locations within the interval between two magnetic bands.

In accordance with this aspect of an embodiment of the invention, the ram is outfitted with a plurality of equally-spaced bands of magnetic material disposed circumferentially around the girth of the ram or placed as required or desired.

Further in accordance with this aspect of an embodiment of the invention, the method comprises the following steps:

acquiring a first signal related to the position of the ram; acquiring a second signal related to the position of the ram that is 90 degrees out of phase with the first signal related to the position of the ram; comparing the first signal related to the position of the ram to the second signal related to the position of the ram, selecting the signal with the lesser instantaneous magnitude as the primary signal, selecting the signal with the greater instantaneous magnitude as the secondary signal, and producing a reference signal indicating whether the first signal related to the position of the ram or the second signal related to the position of the ram was selected as the primary signal; converting the primary signal into a phase angle signal; determining angular movement over time based on the value of the phase angle signal over time and creating an angular movement signal; and converting the angular movement signal into traditional quadrature output signals.

Still further in accordance with this aspect of an embodiment of the invention, converting the primary signal into a phase angle signal corresponding comprises the following steps: producing a normalized position signal by mapping the primary signal to a corresponding substantially sinusoidal signal with a known amplitude; converting the normalized position signal into an uncorrected phase angle signal corresponding to the instantaneous phase angle of the normalized position signal; and producing a phase angle signal by correcting the phase angle signal based on the values of the secondary signal and the reference signal.

Yet further in accordance with an aspect of an embodiment of the invention, determining angular movement over time and producing a corresponding angular movement output signal comprises the following steps: storing the phase angle signal and outputting a previous iteration phase angle output equal to the phase angle signal; subtracting the previous iteration phase angle signal from the phase angle signal and producing an uncorrected angular movement signal; and producing the angular movement signal by correcting the uncorrected angular movement signal in the case of an overflow or underflow.

Still further in accordance with an aspect of an embodiment of the invention, acquiring the first signal related to the position of the ram comprises using a first transducer and a second transducer mounted in close proximity to the ram such that when the ram moves the plurality of bands of magnetic material disposed circumferentially around the girth of the ram pass the transducers thereby generating a first transducer output signal and a second transducer output signal. Yet further in accordance with this aspect of the invention, the first transducer and the second transducer are positioned linearly with respect to each other and are spaced such that the distance between the first transducer and the second transducer is one-half of the distance between two adjacent bands of magnetic material disposed circumferentially around the girth of the ram such that the first transducer output signal is 180 degrees out of phase with the second transducer output signal.

Still further in accordance with an aspect of an embodiment of the invention, acquiring the second signal related to the position of the ram comprises using a third transducer and a fourth transducer mounted in close proximity to the ram such that when the ram moves the plurality of bands of magnetic material disposed circumferentially around the girth of the ram pass the transducers thereby generating a third transducer output signal and a fourth transducer output signal. Yet further in accordance with this aspect of the invention, the third transducer and the fourth transducer are positioned linearly with respect to each other and are spaced such that the distance between the third transducer and the fourth transducer is one-half of the distance between two adjacent bands of magnetic material disposed circumferentially around the girth of the ram. Consequently, the third transducer output signal is 180 degrees out of phase with the fourth transducer output signal. Still further in accordance with this aspect of the invention, the third transducer is located between the first transducer and the second transducer, and the distance between the third transducer and the first transducer and the third transducer and the second transducer is one-quarter of the distance between two adjacent bands of magnetic material disposed circumferentially around the girth of the ram. Still further in accordance with this invention, the distance between the fourth transducer and the first transducer is three-quarters of the distance between two adjacent bands of magnetic material disposed circumferentially around the girth of the ram, and the distance between the fourth transducer and the second transducer is one-quarter of the distance between two adjacent bands of magnetic material disposed circumferentially around the girth of the ram.

Still further in accordance with an aspect of an embodiment of the invention, acquiring the first signal related to the position of the ram further comprises the following steps: producing a first combined signal by subtracting the second transducer output signal from the first transducer output signal and amplifying the resulting signal; producing a first digital error output signal; converting the first digital error output signal into a first analog error signal; producing a first calibrated signal by subtracting the first analog error signal from the first combined signal; and producing the first signal related to the position of the ram by converting the first calibrated signal into a corresponding digital signal.

Yet further in accordance with an aspect of an embodiment of the invention, acquiring the second signal related to the position of the ram comprises the following steps: producing a second combined signal by subtracting the fourth transducer output signal from the third transducer output signal and amplifying the resulting signal; producing a second digital error output signal; converting the second digital error output signal into a second analog error signal; producing a second calibrated signal by subtracting the second analog error signal from the second combined signal; and producing the second signal related to the position of the ram by converting the second calibrated signal into a corresponding digital signal.

Still further in accordance with an aspect of an embodiment of the invention, producing the first digital error signal comprises the following steps: performing a time-average of the first signal related to the position of the ram, and subtracting it from the value of the direct current offset required by the first analog-to-digital converter.

Yet further in accordance with an aspect of an embodiment of the invention, producing the second digital error signal comprises the following steps: performing a time-average of the second signal related to the position of the ram and subtracting it from the value of the direct current offset required by the second analog-to-digital converter.

While some of the embodiments discussed herein may rely on a ram or substrate to generate the sinusoidal signals, one of ordinary skill in the art will appreciate that these sinusoidal signals may be generated by other well-known means, such as by an optical encoder or the like. For example, and not limited thereto, the substrate/target of the system may be an optical encoder. The optical encoder may be an encoder wheel or the like. The optical encoder wheel may comprise apertures wherein when at least one of the first signal acquisition means and second signal acquisition means may be an optical detector. The optical detector may be a photo diode or the like.

These and other objects, along with advantages and features of the invention disclosed herein, will be made more apparent from the description, figures and claims that follow.

BRIEF SUMMARY OF THE DRAWINGS

The foregoing and other objects, features and advantages of the present invention, as well as the invention itself, will be more fully understood from the following description of preferred embodiments, when read together with the accompanying drawings in which.

DETAILED DESCRIPTION OF THE INVENTION

Figure 1:
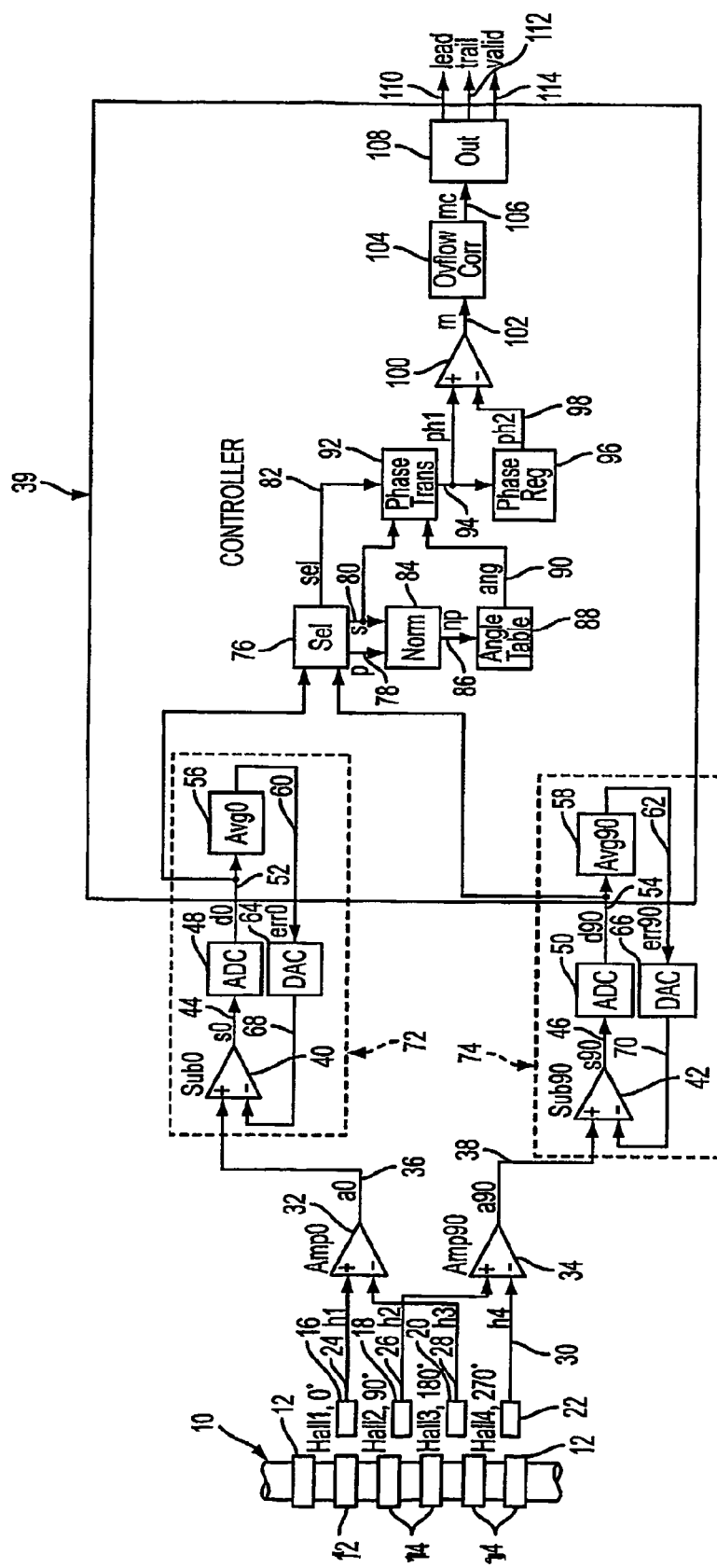
FIG. 1 is a schematic diagram, showing a ram subject to axial movement, transducers for sensing movement of the ram, and the signal processing components of an embodiment of the present invention in block diagram form.

Turning now to the drawings, FIG. 1 shows a substrate such as a ram 10, piston, target, optical encoder, or the like subject to axial movement. The ram 10 (i.e., piston, target, optical encoder, substrate or work piece) has equally-spaced bands 12 of magnetic material disposed circumferentially around its girth. In an embodiment, the bands of magnetic material 12 are spaced at intervals 14 that are ½0th of an inch. However, one of ordinary skill in the art will appreciate that other intervals are possible.

Four transducers 16, 18, 20, 22, are mounted in close proximity to the ram 10 such that when the ram 10 moves, the bands of magnetic material 12 pass the transducers 16, 18, 20, 22 thereby generating four sinusoidal transducer output signals 24, 26, 28, 30 related to the position and displacement of the ram 10. The four transducers 16, 18, 20, 22 are spaced at precise distances with respect to one another such that the distance between the first transducer 16 and the second transducer 18 is one-fourth of the interval 14 between the bands of magnetic material 12 disposed circumferentially around the girth of the ram 10; the distance between the second transducer 18 and the third transducer 20 is one-fourth of the interval 14 between the bands of magnetic material 12 disposed circumferentially around the girth of the ram 10; and the distance between the third transducer 20 and the fourth transducer 22 is one-fourth of the interval 14 between the bands of magnetic material 12 disposed circumferentially around the girth of the ram 10. Consequently, the first transducer output signal 24 is 90 degrees out of phase with the second transducer output signal 26; 180 degrees out of phase with the third transducer output signal 28; and 270 degrees out of phase with the fourth transducer output signal 30. Thus, the four transducer output signals 24, 26, 28, 30 are defined by the following equations:

$$\text{first transducer output signal} = \cos\left(360° \times \frac{\text{position}}{\text{interval}}\right) \quad (1)$$

$$\text{second transducer output signal} = \cos\left(360° \times \frac{\text{position}}{\text{interval}} - 90°\right) \quad (2)$$

$$\text{third transducer output signal} = \cos\left(360° \times \frac{\text{position}}{\text{interval}} - 180°\right) \quad (3)$$

$$\text{fourth transducer output signal} = \cos\left(360° \times \frac{\text{position}}{\text{interval}} - 270°\right) \quad (4)$$

In an embodiment, the four transducers 16, 18, 20, 22 are Hall-effect sensors. However, one of ordinary skill in the art will appreciate that other magnetic transducers could also be used.

The first transducer output signal 24 is applied to one terminal of the first signal combiner 32 and the third transducer output signal 28 is applied to the second terminal of the first signal combiner 32. The output voltage for the first signal combiner 32 follows the equation:

$$\text{first combined signal} = \quad (5)$$
$$\text{gain} \times (\text{first transducer output} - \text{third transducer output})$$

$$\text{first combined signal} = \quad (6)$$
$$\text{gain} \times \left(\cos\left(360° \times \frac{\text{position}}{\text{interval}}\right) - \cos\left(360° \times \frac{\text{position}}{\text{interval}} - 180°\right)\right)$$

$$\text{first combined signal} = 2 \times \text{gain} \times \cos\left(360° \times \frac{\text{position}}{\text{interval}}\right) \quad (7)$$

In an embodiment, the first signal combiner 32 is a differential amplifier. However, one of ordinary skill in the art will appreciate that other components could be employed in place of a differential amplifier.

The second transducer output signal 24 is applied to one terminal of the second signal combiner 34 and the fourth transducer output signal 30 is applied to the second terminal of the second signal combiner 34. The output voltage for the second signal combiner 34 follows the equation:

$$\text{second combined signal} = \quad (8)$$
$$\text{gain} \times (\text{second transducer output} - \text{fourth transducer output})$$

$$\text{second combined signal} = \quad (9)$$
$$\text{gain} \times \left(\cos\left(360° \times \frac{\text{position}}{\text{interval}}\right) - \cos\left(360° \times \frac{\text{position}}{\text{interval}} - 180°\right)\right)$$

$$\text{second combined signal} = 2 \times \text{gain} \times \sin\left(360° \times \frac{\text{position}}{\text{interval}}\right) \quad (10)$$

In an embodiment, the second signal combiner 34 is a differential amplifier. However, one of ordinary skill in the art will appreciate that other components could be employed in place of a differential amplifier.

Thus, the first combined signal 36 and the second combined signal 38 are dependent upon the position of the ram 10. Moreover, the first combined signal 36 and the second combined signal 38 are approximately sinusoidal and vary through one sinusoidal period for each interval 14 of axial movement of the ram 10. Representations of the first combined signal 36 and the second combined signal 38 over time are illustrated graphically in FIG. 2, having an x-axis in degrees and a y-axis amplitude in volts. As can be seen, the first combined signal 36 is sinusoidal. The second combined signal 38 is also sinusoidal but is 90 degrees out of phase with the first combined signal. In other words, the first combined signal and the second combined signal are in quadrature. While some of the embodiments discussed herein may rely on a ram or substrate to generate the sinusoidal signals, one of ordinary skill in the art will appreciate that these sinusoidal signals may be generated by other well-known means, such as by an optical encoder or the like. For example, and not limited thereto, the substrate/target of the system may be an optical encoder. The optical encoder may be an encoder wheel or the like. The optical encoder wheel may comprise apertures wherein when at least one of the first signal acquisition means and second signal acquisition means may be an optical detector. The optical detector may be a photo diode or the like.

After acquiring the first combined signal 36 and the second combined signal 38, the invention performs a number of digital signal processing techniques on the two signals 36, 38. In an embodiment of this invention, the digital signal processing techniques are performed on the first combined signal 36 and the second combined signal 38 using a digital controller 39. In particular, in an embodiment of this invention, the digital controller is a MSP430 Mixed Signal Processor manufactured by Texas Instruments. However, one of ordinary skill in the art will appreciate that the digital signal processing techniques could be accomplished using a wide variety of other components, including, but not limited to, other signal processing chips or digital controllers, field programmable gate arrays, or discrete circuit components.

Two analog-to-digital (A-D) converters 48, 50 convert the first combined signal 36 and the second combined signal 38 into corresponding digital signals 52, 54. In an embodiment of this invention, the two A-D converters 48, 50 are included on the MSP430 Mixed Signal Processor and require that the input signals have a direct current (DC) offset of 1.5 V. However, one of ordinary skill in the art will appreciate that different A-D converters could be used in place of the A-D converters on the MSP430 Mixed Signal Processor and that such A-D converters might required different DC offsets.

The first combined signal 36 and the second combined signal 38 both have unpredictable DC offset components due to manufacturing tolerances, placement tolerances, variations in magnetic flux intensity, and other factors. In order to calibrate the first combined signal 36 and the second combined signal 38 such that they both exhibit the DC offset required by the two A-D converters 48, 50, two simple control loops 72, 74 are used. In an embodiment of this invention, calibration is controlled by the MSP403 Mixed Signal Processor and is performed only when power is first applied to the system. However, one of ordinary skill in the art will appreciate that calibration could be achieved without relying on the MSP403 Mixed Signal Processor. Furthermore, one of ordinary skill in the art will also recognize that calibration could be performed continuously, periodically, or aperiodically during operation of the system.

The first control loop 72 used to calibrate the DC offset of the first combined signal 36, consists of the first A-D converter 48, the first averager 56, the first digital-to-analog (D-A) converter 64, and the first subtractor 40. The first averager 56 generates a first digital error signal 60. During calibration, the first digital error signal 60 is set to zero volts. The zero-volt first digital error signal 60 is then converted to a zero-volt first analog error signal 68 by the first D-A converter 64. The first combined signal 36 and the first analog error signal 68 are then applied to the inputs of the first subtractor 40 and the first calibrated signal 44 is generated by subtracting the first analog error signal 68 from the first combined signal 36. The first calibrated signal 44 thus follows the first combined signal 36 during calibration. The first calibrated signal 44 is then passed to the first A-D converter 48 and converted into the first sinusoidal signal 52 related to the position of the ram. The first averager 56 then performs a time-average of the first sinusoidal signal 52 related to the position of the ram over an interval of time equal to an integer multiple of one period of the first sinusoidal signal 52 related to the position of the ram. After calibration is complete, the first averager 56 sets the value of the first digital error signal 60 by subtracting the average value of the first sinusoidal signal 52 related to the position of the ram from the value of the DC offset required by the first A-D converter 48:

$$\text{first digital error signal} = \text{required DC offset} - \text{average of first signal related to position} \quad (11)$$

The first digital error signal 60 is then converted into the corresponding first analog error signal 68 by the first D-A converter 64 and the first subtractor 40 removes the error component from subsequent analog values of the first combined signal 36. Hereafter, the first calibrated signal 44 will have a precise DC offset equal to the DC offset required by the first A-D converter 48.

The second combined signal 38 is calibrated to the appropriate DC offset by the same process as that used for the first combined signal 36. The second control loop 74 used to calibrate the DC offset of the second combined signal 38, consists of the second A-D converter 50, the second averager 58, the second digital-to-analog (D-A) converter 66, and the second subtractor 42. The second averager 58 generates a second digital error signal 62. During calibration, the second digital error signal 62 is set to zero volts. The zero-volt second digital error signal 62 is then converted to a zero-volt second analog error signal 70 by the second D-A converter 66. The second combined signal 38 and the second analog error signal 70 are then applied to the inputs of the second subtractor 42 and the second calibrated signal 46 is generated by subtracting the second analog error signal 70 from the second combined signal 38. The second calibrated signal 46 thus follows the second combined signal 38 during calibration. The second calibrated signal 46 is then passed to the second A-D converter 50 and converted into the second sinusoidal signal 54 related to the position of the ram. The second averaging component 58 then performs a time-average of the second sinusoidal signal 54 related to the position of the ram over an interval of time equal to an integer multiple of one period of the second sinusoidal signal 54 related to the position of the ram. After calibration is complete, the second averaging component 58 sets the value of the second digital error signal 62 by subtracting the average value of the second sinusoidal signal 54 related to the position of the ram from the value of the DC offset required by the second A-D converter 50:

$$\text{second digital error signal} = \text{required DC offset} - \text{average of second signal related to position} \quad (12)$$

The second digital error signal 62 is then converted into the corresponding second analog error signal 70 by the second D-A converter 66 and the second subtractor 42 removes the error component from subsequent analog values of the second combined signal 38. Hereafter, the second calibrated signal 46 will have a precise DC offset equal to the DC offset required by the second A-D converter 50.

As already disclosed, in an embodiment of this invention, the first A-D converter 48 and the second A-D converter 50 are included on the MSP430 Mixed Signal Processor. The A-D converters on the MSP430 Mixed Signal Processor convert analog signals within the range of 0 V-3 V to 12-bit signed integer values within the range −2048-2047. In an embodiment, after calibration and conversion, both the first sinusoidal signal 52 related to the position of the ram and the second sinusoidal signal 54 related to the position of the ram are centered in the middle of the 12-bit sampling window at a DC offset of zero.

After conversion, the first sinusoidal signal 52 related to the position of the ram and the second sinusoidal signal 54 related to the position of the ram are passed to a signal selection component 76. The signal selection component 76 compares the instantaneous magnitude of the first sinusoidal signal 52 related to the position of the ram to the instantaneous magnitude of the second sinusoidal signal related to the position of the ram and selects the signal with the lesser instantaneous magnitude as the primary signal 78 and the signal with the greater instantaneous magnitude as the secondary signal 80. The signal selection component 76 also produces as an output a reference signal 82 indicating whether the signal selection component 76 selected the first sinusoidal signal 52 related to the position of the ram or the second sinusoidal signal 54 related to the position of the ram as the primary signal 78. In an embodiment of this invention, the reference signal 82 is set to 0 when the first sinusoidal signal 52 related to the position of the ram is selected as the primary signal 78 and the reference signal 82 is set to 1 when the second sinusoidal signal 54 related to the position of the ram is selected as the primary signal 78.

After one signal has been selected as the primary signal 78, the normalization component 84 converts the primary signal 78 into the normalized position signal 86 by normalizing the primary signal 78. That is, the normalization component 84 maps the primary signal 78 with unknown amplitude to a corresponding sinusoidal signal with a known amplitude.

The first step required to normalize the primary signal 78 is to estimate the amplitude of the primary signal 78. This is accomplished by taking advantage of the relationship between the primary signal 78 and the secondary signal 80. The primary signal 78 and the secondary signal 80 were derived from the first calibrated signal 44 and the second calibrated signal 46 and therefore both have the same amplitude and the same frequency. Furthermore, the primary signal 78 and the secondary signal 80 are 90 degrees out of phase. That is, if the first sinusoidal signal 52 related to the position of the ram was selected as the primary signal 78, the primary signal 78 and the secondary signal 80 have the form amplitude×cos(x) and amplitude×sin(x) respectively. On the other hand, if the second sinusoidal signal 54 related to the position of the ram was selected as the primary signal 78, the primary signal 78 and the secondary signal 80 have the form amplitude×sin(x) and amplitude×cos(x) respectively. Thus, according to the geometric identity $\sin^2(x)+\cos^2(x)=1$:

$$\sqrt{p^2+s^2} = \sqrt{amplitude^2 \times (\cos^2(x)+\sin^2(x))} = amplitude \quad (13)$$

$$amplitude = \sqrt{p^2+s^2} \quad (14)$$

where "p" represents the instantaneous magnitude of the primary signal 78 and "s" represents the instantaneous magnitude of the secondary signal 80. Therefore, it is possible to estimate the amplitude of the primary signal 78 by taking the square root of the sum of the square of the instantaneous amplitude of the primary signal 78 and the square of the instantaneous amplitude of the secondary signal 80.

After $p^2+s^2$ has been calculated, an embodiment of this invention utilizes a lookup table to bypass the costly digital square-root operation required by equation (14). In an embodiment of this invention, only 11-bit amplitudes are meaningful because, as disclosed before, both the primary signal 78 and the secondary signal 80 are 12-bit signed integers. Accordingly, the maximum amplitude of the primary signal 78 is 2048. Elements in the lookup table are stored in read-only memory with addresses 1, 2, . . . 2048 and the value stored in each memory address equals the square of that address. For example, the value stored at address 4 is 16, and the value stored at address 5 is 25. In order to determine the square root of the sum, the normalizing component performs a binary search of the lookup table until the sum is located. Once the value of the sum is located in the lookup table, the square root of the sum is known because the memory address of each element in the lookup table corresponds to the square root of the value stored in that memory address. Due to the fact that in an embodiment of the invention there are only 2048 entries in the lookup table the costly digital square-root operation is reduced to a simple 11-step binary search.

After estimating the amplitude of the primary signal 78, the final step required to normalize the primary signal 78 is to scale the primary signal 78. The normalization component 84 scales the primary signal 78 to the desired known amplitude according to the following equation:

$$\text{normalized position signal} = \frac{\text{known amplitude} \times p}{\text{amplitude}} \quad (15)$$

In order to eliminate the costly division required by equation (15), a second lookup table is utilized in an embodiment of the invention.

Elements in the lookup table are stored in read-only memory with addresses 1, 2, . . . 2048, with each address corresponding to one possible value for the amplitude of the primary signal 78. The value stored at each memory address is equal to:

$$\text{value} = \left\lfloor \frac{\text{known amplitude}}{\text{address}} \times 2^{10} \right\rfloor \quad (16)$$

where ⌊ ⌋ represents the floor (or round down) operation.

The first step in scaling the primary signal 78, therefore, is to obtain the value stored in the memory address of the lookup table that corresponds to the estimated value of the amplitude of the primary signal 78. After retrieving this value from the lookup table, it is multiplied by the instantaneous value of the primary signal 78. Finally, in order to compensate for the multiplication by $2^{10}$ in equation (16), it is necessary to divide the result by $2^{10}$. In an embodiment of this invention, this division is accomplished by shifting the result right by ten bits. (The right shift operation is a fast digital technique for dividing by $2^{10}$.) Therefore, the process of scaling the primary signal 78 is summarized by the following equation:

$$\text{normalized position signal} = \quad (17)$$
$$\left\lfloor \frac{\text{known amplitude}}{\text{amplitude}} \times 2^{10} \right\rfloor \times p \times 2^{-10} \approx \frac{\text{known amplitude} \times p}{\text{amplitude}}$$

In an embodiment of this invention, the normalization component 84 is implemented in software within the MSP430 Mixed Signal Processor. However, one of ordinary skill in the art will appreciate that the normalization component 84 could be implemented by a variety of other means including as a separate external component.

After normalizing the primary signal, the normalized position signal 86 is converted into a phase angle signal 94. The value of the phase angle signal 94 represents the value of the phase angle of the normalized position signal 86 resolved to within a predefined subinterval within the range [0, 360 degrees]. In other words, the phase angle signal 94 does not represent the precise value of the phase angle of the normalized position signal 86. Rather, the phase angle signal 94 indicates that the precise value of the phase angle of the normalized position signal 86 falls within a particular subinterval within the range [0, 360 degrees]. The ultimate resolution of the system depends on the number of predefined subintervals within the range [0, 360 degrees]. In an embodiment of the invention, 32 subintervals are utilized. Consequently, in an embodiment of the invention, each subinterval spans a range of 11.25 degrees and the phase angle signal 94 indicates whether the precise phase angle of the normalized position signal 86 falls within the subinterval [0, 11.25 degrees], [11.25, 22.50 degrees], [22.50 degrees, 33.75 degrees], [33.75 degrees, 45.0 degrees], [45.0 degrees, 56.25 degrees], [56.25 degrees, 67.50 degrees], [67.50, 78.75 degrees], [78.75, 90 degrees], [90.0, 101.25 degrees], [101.25, 112.50 degrees], [112.05, 123.75 degrees], [123.75, 135.0 degrees], [135.0, 146.25 degrees], [146.25, 157.50 degrees], [157.50, 168.75 degrees], [168.75, 180.0 degrees], [180.0, 191.25 degrees], [191.25, 202.50 degrees], [202.50, 213.75 degrees], [213.75, 225.0 degrees], [225.0, 236.25 degrees], [236.25, 247.50 degrees], [247.50, 258.75 degrees], [258.75, 270.0 degrees], [270.0, 281.25 degrees], [281.25, 292.50 degrees], [292.50, 303.75], [303.75, 315.0 degrees], [315.0, 326.25 degrees], [326.25, 337.50 degrees], [337.50, 348.75 degrees], or [348.75, 360.0 degrees].

In order to resolve the phase angle of the normalized position signal 86 into the appropriate subinterval, the normalized position signal 86 is passed to the phase angle lookup component 88. The phase angle lookup component 88 resolves the value of the phase angle of the normalized position signal 86 to within the appropriate subinterval within the range [0, 180 degrees] and converts the normalized position signal 86 into the uncorrected phase angle signal 90. The value of the uncorrected phase signal 90 indicates within which subinterval the precise value of the phase angle of the normalized position signal 86 falls. The phase angle lookup component 88 accomplishes this conversion according to the following formula:

$$\text{uncorrected phase angle} = \left\lfloor \frac{\text{resolution}}{360°} \times \arccos\left(\frac{\text{normalized position signal}}{\text{known amplitude}}\right) \right\rfloor \quad (18)$$

where the value of resolution is the number of subintervals within the range [0, 360 degrees]. The domain of the arccosine function is [−1, 1]. Division of the normalized position signal 86 by the known amplitude of the normalized position signal 86 is required to map the instantaneous value of the normalized position signal 86 which, in an embodiment of this invention can vary from [−2048, 2047], to the required [−1, 1] domain. Multiplication of the result of the arccosine operation by the constant term (resolution/360 degrees) and the subsequent floor operation maps the result of the arccosine operation onto the integer interval [0, (resolution/2)−1].

The arccosine operation and the division operation are both complicated digital operations. Accordingly, an embodiment of this invention utilizes a lookup table to bypass these costly operations. As disclosed previously, in an embodiment of this invention, the amplitude of the normalized position signal 86 is 2048. In other words, the value of the normalized position signal 86 varies over the interval [−2048, 2047]. Therefore, the lookup table stores elements in read-only memory with addresses −2048, −2047, ..., 2046, 2047 corresponding to all possible values of the normalized position signal 86 and the value stored at each memory address of the lookup table is equal to the value of the uncorrected phase angle signal 90 corresponding to the value of the normalized position signal 86 as defined in equation (18) above. Consequently, the costly digital operations required to calculate the value of the uncorrected phase signal 90 are reduced to a simple memory retrieval operation. In an embodiment of this invention, the phase angle lookup component 88 is implemented in software within the MSP430 Mixed Signal Processor. However, one of ordinary skill in the art will appreciate that the phase angle converter 88 could be implemented by a variety of other means including as a separate external component.

Due to the fact that the range of the arccosine function is [0, 180 degrees], the phase angle lookup component 88 only resolves the value of the phase angle of the normalized position signal 86 to a value within the range [0, (resolution/2)−1] corresponding to a particular subinterval within the range [0, 180 degrees]. Therefore, in order to resolve the value of the phase angle of the normalized position signal 86 into a value within the range [0. resolution −1] corresponding to a particular subinterval within the range [0, 360 degrees], the uncorrected phase angle signal 90 is passed to the phase translator 92. The phase translator 92 resolves the value of the phase angle of the normalized position signal 86 into the appropriate subinterval within the range [0, 360 degrees] and converts the uncorrected phase angle signal 90 into the phase angle signal 94. In addition, in the case that the uncorrected phase angle signal 90 was derived from the second combined signal 38, a sinusoidal signal that is 90 degrees ahead of the first combined signal 36, the phase translator 92 shifts the resulting phase angle signal 90 degrees forward.

In addition to receiving the uncorrected phase angle signal 90, the phase translator 92 also receives the reference signal 82 and the secondary signal 80. If the reference signal 82 indicates that the first sinusoidal signal 52 related to the position of the ram was selected as the primary signal 78, the phase translator 92 only resolves the value of the phase angle of the normalized position signal 86 into the appropriate subinterval within the range [0, 360 degrees]. The phase translator 92 determines what corrections are required by inspecting the sign of the secondary signal 80 (i.e., the second sinusoidal signal 54 related to the position of the ram). If the value of the secondary signal 80 is greater than zero, then the uncorrected phase angle signal 90 is correctly situated in the interval [0, 180 degrees]. Thus, if the sign of the secondary signal 80 is greater than zero, the phase angle signal 94 is defined by the equation:

$$\text{phase angle signal} = \text{uncorrected phase angle signal} \quad (19)$$

If the value of the secondary signal 80 is less than zero, then the uncorrected phase angle signal 90 must be shifted to be in the interval [180, 360 degrees]. This correction is performed according to the following equation:

$$\text{phase angle signal} = \text{resolution} - 1 - \text{uncorrected phase angle signal} \quad (20)$$

If the reference signal 82 indicates that the second sinusoidal signal 54 related to the position of the ram was selected as the primary signal 78, the phase translator 92 resolves the value of the phase angle of the normalized position signal 86 into the appropriate subinterval within the range [0, 360 degrees] and also shifts the result forward 90 degrees. The phase translator 92 determines what corrections are required by inspecting the sign of the secondary signal 80 (i.e., the first sinusoidal signal 52 related to the position of the ram). If the value of the secondary signal 80 is less than zero, then the uncorrected phase angle signal 90 is correctly situated in the interval [0, 180 degrees] and only the 90-degree forward shift correction is required. Thus, if the value of the secondary signal 80 is less than zero, the value of the phase angle signal 94 is defined by the equation:

$$\text{phase angle signal} = \left(\text{uncorrected phase angle signal} + \frac{\text{resolution}}{4}\right) \% \text{ resolution} \quad (21)$$

where the % symbol represents modulo division. If the value of the secondary signal is greater than zero, then the value of the uncorrected phase angle signal 90 must be mapped into the interval [180, 360 degrees] and the result must be shifted forward 90 degrees. Thus, if the value of the secondary signal 80 is greater than zero, the value of the phase angle signal 94 is defined by the equation:

$$\text{phase angle signal} = \left((\text{resolution} - 1 - \text{uncorrected phase angle signal}) + \frac{\text{resolution}}{4}\right) \% \text{ resolution} \quad (22)$$

The phase angle signal 94 therefore represents an unsigned integer between the range [0, resolution−1]. In an embodiment of this invention, the phase translator 92 is implemented in software within the MSP430 Mixed Signal Processor. However, one of ordinary skill in the art will appreciate that the phase translator 92 could be implemented by a variety of other means including as a separate external component.

Angular displacement is determined by monitoring the change in value of the phase angle signal 94 over time. Accordingly, the phase angle signal 94 is sent to both the phase register 96 and the phase subtractor 100. The phase register stores the value of the phase angle signal 94 for one sensing iteration and then produces a previous iteration phase angle signal 98 equal to the stored value of the phase angle signal 94. In other words, the phase register 96 holds the value of the phase angle signal 94 from the previous iteration.

The phase subtractor 100 receives both the phase angle signal 94 and the previous iteration phase angle signal 98 and determines the amount of angular movement that occurred during the current iteration by subtracting the value of the previous iteration phase angle signal 98 from the value of the phase angle signal 94. In other words, the amount of angular movement during one sensing iteration is simply the difference between the value of the phase angle signal 94 and the previous iteration phase angle signal 98. Thus, the output of the phase subtractor 100, the uncorrected angular movement signal 102, is defined by the equation:

$$\text{uncorrected angular movement signal} = \text{phase angle signal} - \text{previous iteration phase angle signal} \quad (23)$$

In an embodiment of this invention, the phase register 96 and the phase subtractor 100 are implemented in software within the MSP430 Mixed Signal Processor. However, one of ordinary skill in the art will appreciate that the phase register 96 and the phase subtractor 100 could be implemented by a variety of other means including as a separate external component.

Depending on the amount of angular movement during a particular iteration, the system might experience overflow or underflow. Overflow occurs when the phase angle transitions from 359 degrees to 0 degrees. In such a situation, the system will recognize an apparent angular movement of −359 degrees when only 1 degrees of actual angular movement has occurred. Similarly, underflow occurs when the phase angle transitions from 0 degrees to 359 degrees. In such a situation, the system will recognize an apparent angular movement of 359 degrees when only −1 degrees of actual angular movement has occurred. The overflow corrector 104 compensates for any overflow or underflow reflected in the uncorrected angular movement signal (UAMS) 102 and produces an output signal, the angular movement signal (AMS) 106, defined by the following equation:

$$AMS = \begin{cases} UAMS - \text{resolution}, & \text{if } UAMS > \text{resolution}/2 \\ UAMS + \text{resolution}, & \text{if } UAMS < -\text{resolution}/2 \\ UAMS, & \text{else} \end{cases} \quad (24)$$

In an embodiment of this invention, the overflow corrector 104 is implemented in software within the MSP430 Mixed Signal Processor. However, one of ordinary skill in the art will appreciate that the overflow corrector could be implemented by a variety of other means including as a separate external component.

The angular movement signal 106 is meaningless to most traditional decoders. In order to interface the invention with a traditional decoder, it is necessary for the invention to produce output signals that resemble traditional quadrature output signals. Therefore, the traditional quadrature output emulator 108 is used to convert the angular movement signal 106 into traditional quadrature output signals, lead output signal 110 and trail output signal 112. Traditional quadrature output signals are generally pulse trains generated by passing two sinusoidal signals in quadrature through zero crossing detectors.

Figure 3A:
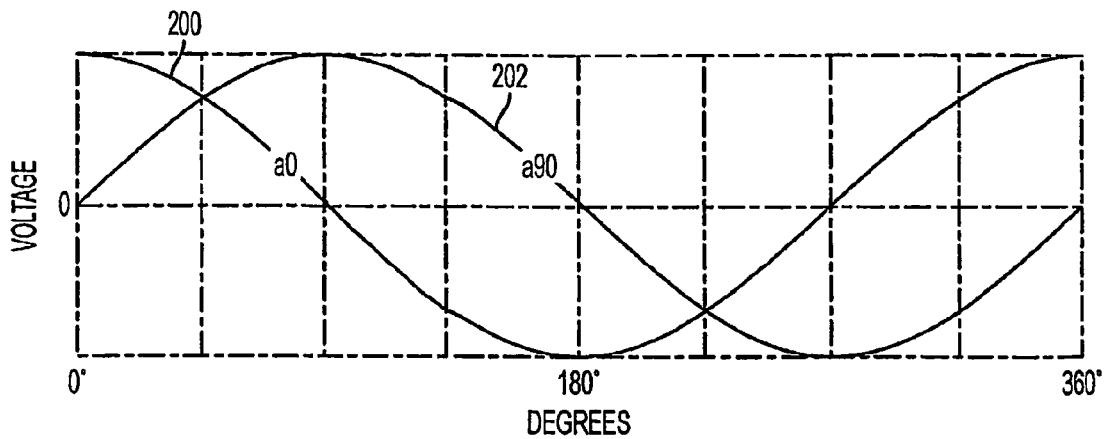
FIG. 3 is a graphic representation of two input sinusoidal signals in quadrature, two conventional quadrature output signals corresponding to the two input sinusoidal signals in quadrature, and two enhanced resolution quadrature output signals corresponding to the two input signals sinusoidal signals in quadrature.
Figure 3B:
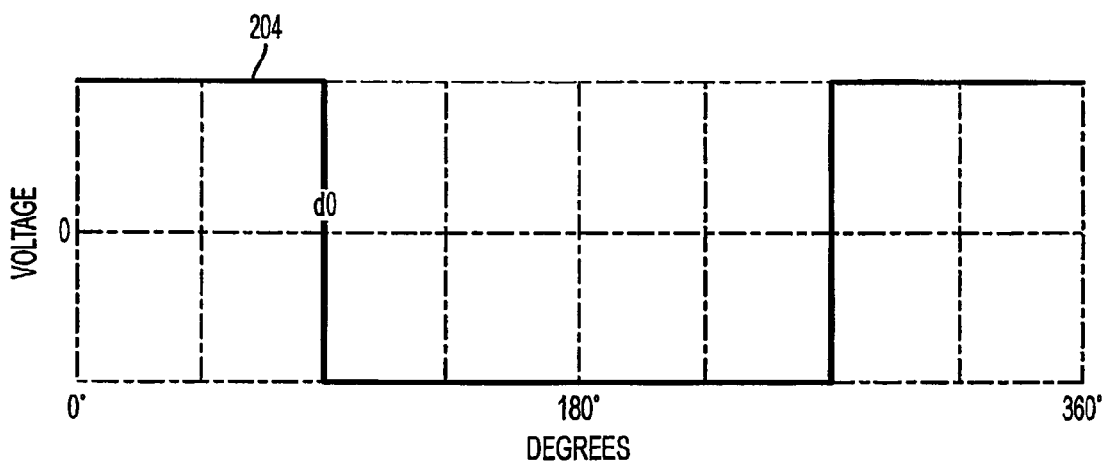
Figure 3C:
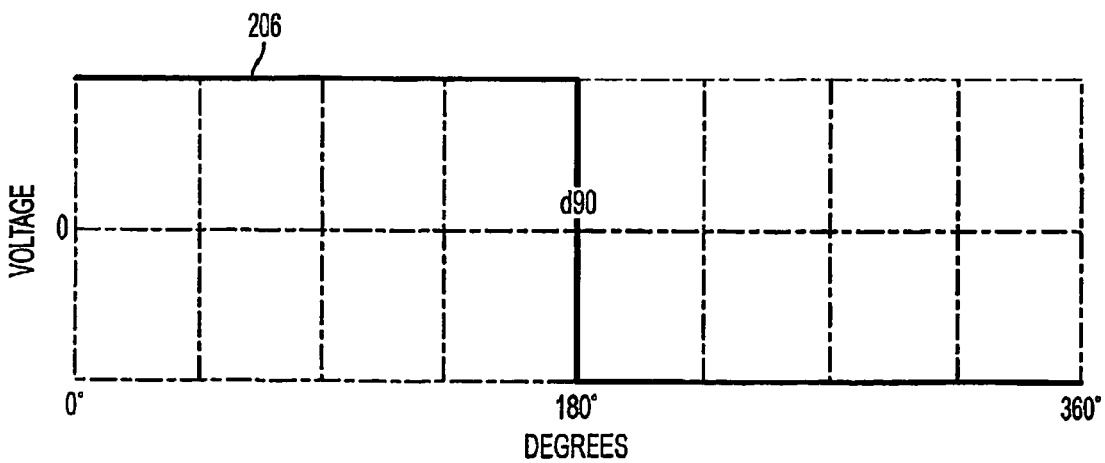

FIGS. 3(A)-(C) graphically illustrate the relationship between two traditional quadrature output signals 204, 206 and the sinusoidal signals 200, 202 in quadrature from which the two traditional quadrature output signals 204, 206 were generated. As shown in FIGS. 3(A) and 3(B), the first quadrature output signal 204 corresponds to the first sinusoidal signal 200. The first quadrature output signal 204 changes state twice, once for each time the first sinusoidal signal 200 crosses zero. As shown in FIGS. 3(A) and 3(C), the second quadrature output signal 206 corresponds to the second sinusoidal signal 202. Similarly, the second quadrature output signal 206 changes state twice, once for each time the second sinusoidal signal 202 crosses zero. Consequently, the two quadrature output signals 204, 206 collectively experience four state changes over one period (i.e., 11, 01, 00, 10).

Figure 3D:
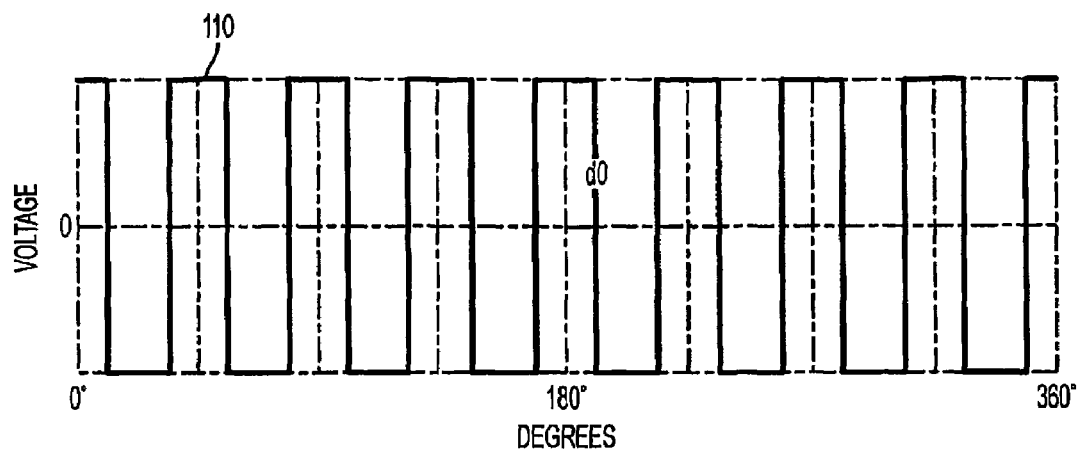
Figure 3E:
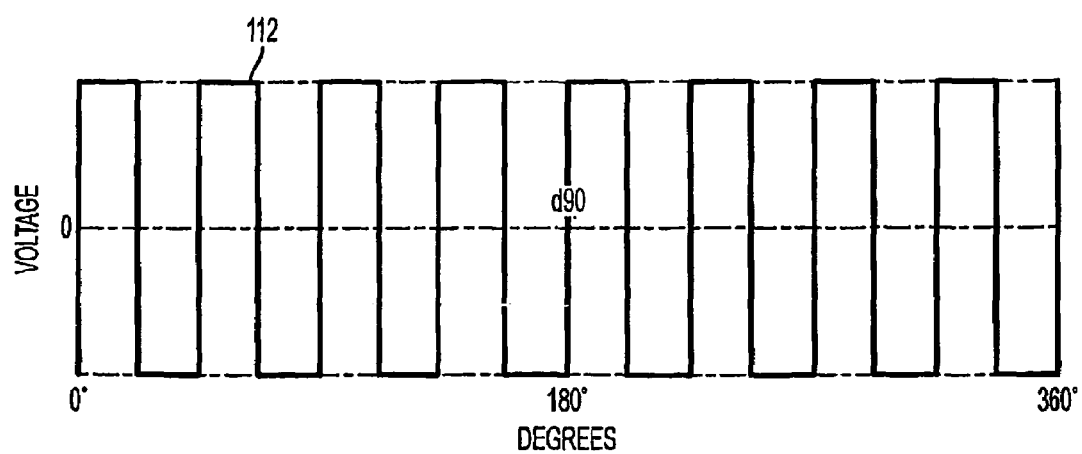
Figure 4:
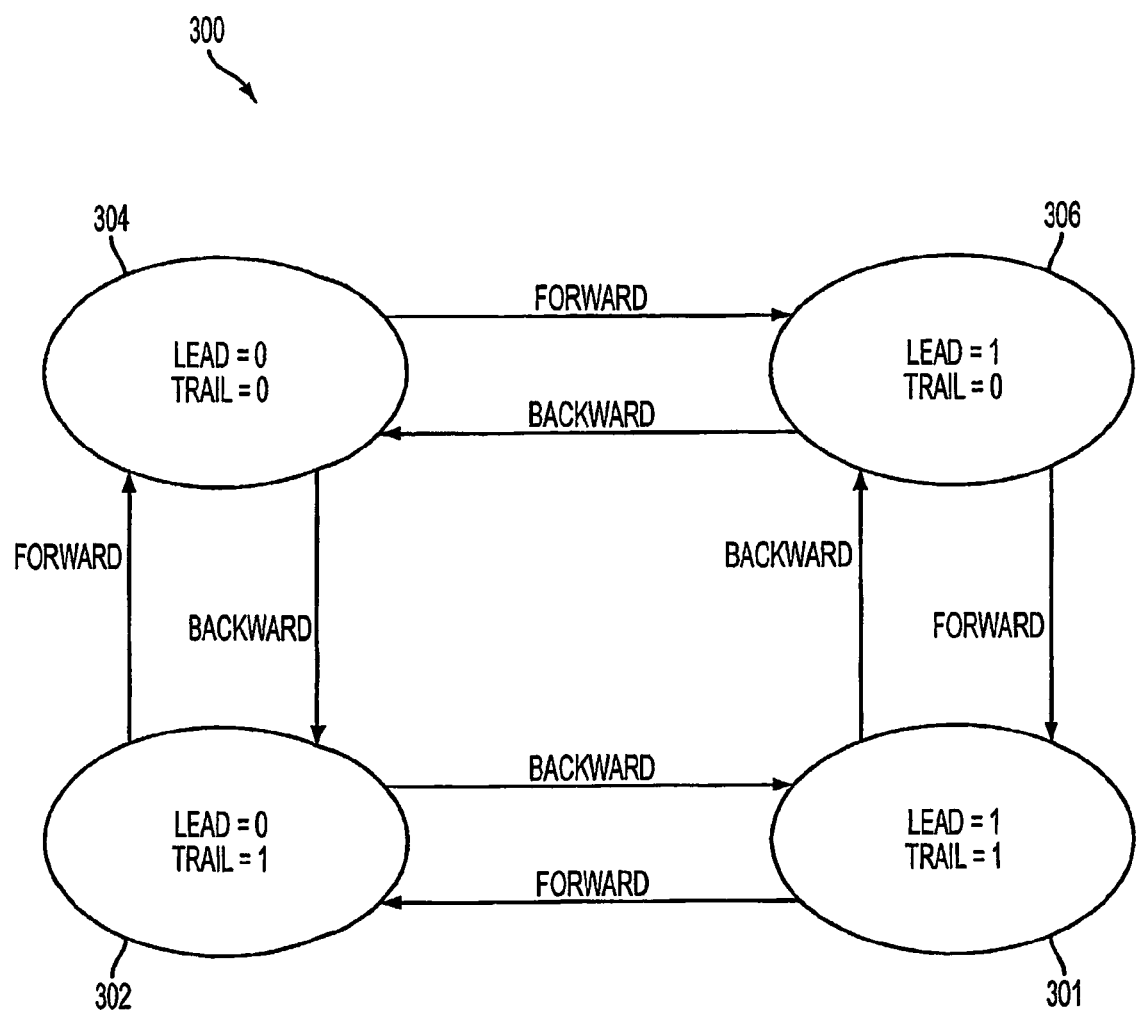
FIG. 4. is a state diagram for a simple finite state machine used to generate traditional quadrature output signals.

The traditional quadrature output emulator 108 (previously discussed in FIG. 1) generates the lead output signal 110 and trail output signal 112. Similar to the first quadrature output signal 204 and the second quadrature output signal 206, the lead output signal 110 and the trail output signal 112 are periodic pulse trains with equal frequencies, as shown in FIGS. 3(D)) and 3(E). Moreover, just as the first quadrature output signal 204 trails the second quadrature output signal 206 by 90 degrees, the lead output signal 110 trails the trail output signal 112 by 90 degrees. In an embodiment of this invention, a simple finite state machine controls the lead and trail signals based on the value of the angular movement signal 106. Turning to FIG. 4, FIG. 4 schematically depicts a state diagram for the simple finite state machine 300 representing the output emulator. The simple state machine has four states 301, 302, 304, 306. The first state 301 corresponds to when the lead output signal 110 equals one and the trail output signal 112 equals one. The second state 302 corresponds to when the lead output signal 110 equals zero and the trail output signal 112 equals one. The third state 304 corresponds to when the lead output signal 110 equals zero and the trail output signal 112 equals zero. The fourth state corresponds to when the lead output signal 110 equals one and the trail output signal equals zero. It should be noted that these states correspond to the same progression of states discussed in connection with the first quadrature output signal 204 and the second quadrature output signal 206.

The traditional quadrature output emulating means 108 uses the value of the angular movement signal 106 to determine how many transitions to follow along the state machine. If the value of the angular movement signal 106 is positive for one sensing iteration, the traditional quadrature output emulator 108 will follow "forward" transitions along the state machine. Similarly, if the value of the angular movement signal 106 is negative for one sensing iteration, the traditional quadrature output emulating means 108 will follow "backward" transitions along the state machine. For example, if the value of the angular movement signal 106 equals 3 for one sensing iteration, and the traditional quadrature output emulator 108 stopped at the first state 301 after the last sensing iteration, the traditional quadrature output emulator 108 will start at the first state 301, and transition forward three states through the second state 302, the third state 304, and the fourth state 306. Consequently, for this sensing iteration, the traditional quadrature output emulator 108 will toggle the lead output signal 110 and the trail output signal 112 through the following progression: lead output signal=0, trail output signal=1; lead output signal=0, trail output signal=0; and lead output signal=1 and trail output signal=0.

Figure 2:
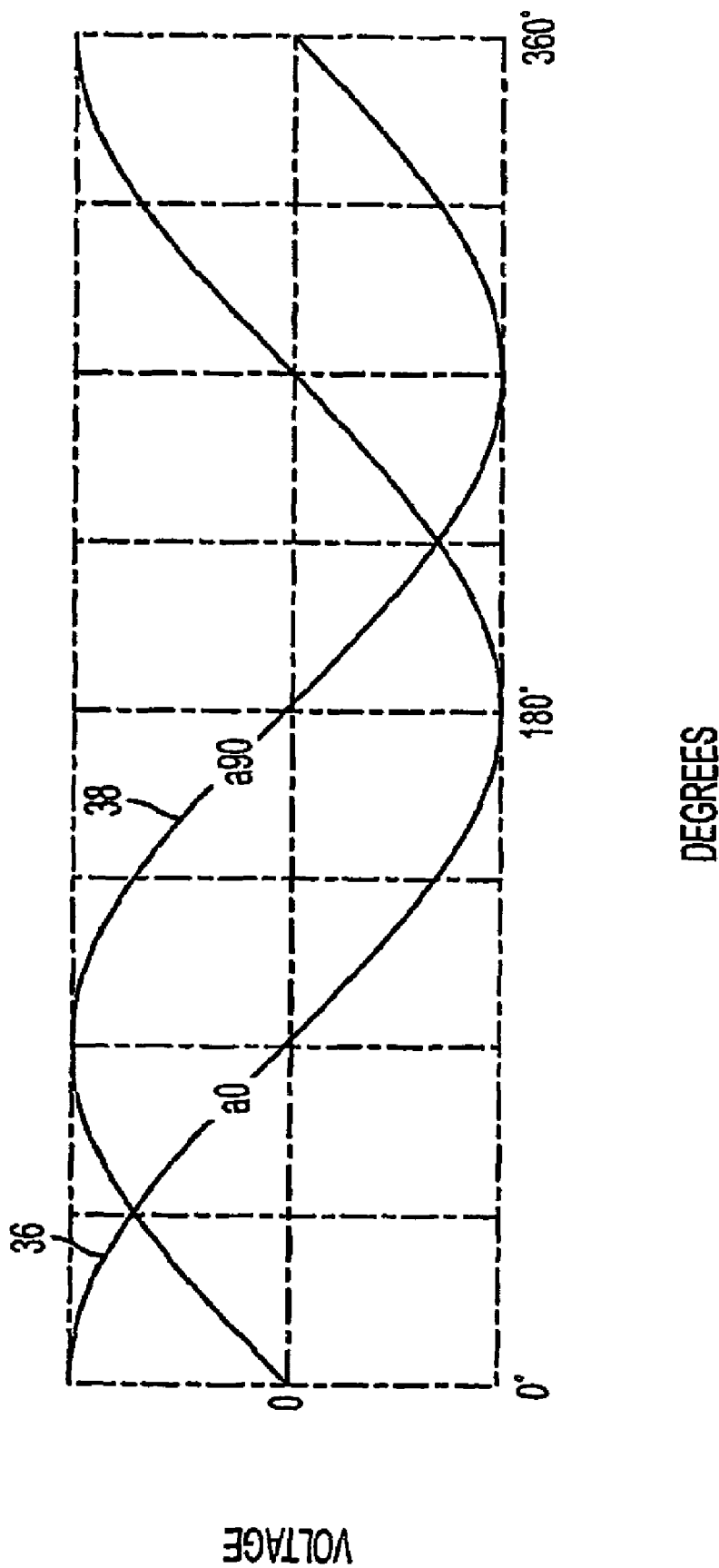
FIG. 2. is a graphic representation of two input signals in quadrature.

As disclosed above, in an embodiment of the invention, the value of the phase angle of the normalized position signal 86 is resolved to within one of thirty-two subintervals within the range [0. 360 degrees]. Accordingly, for each period of the normalized position signal 86, the traditional quadrature output emulating means 108 will generate 32 state changes collectively in the lead output signal 110 and the trail output signal 112. Turning to FIG. 2, the enhanced resolution provided by an embodiment of the invention is evident from a comparison of the waveforms of the lead output signal 110 and the trail output signal 112 and the waveforms of the first quadrature output signal 204 and the second quadrature output signal 206. For each period of the first quadrature output signal 204 and the second quadrature output signal 206, the lead output signal 110 and the trail output signal experience eight periods. Thus, the resolution of an embodiment of the invention is eight times that of a traditional quadrature sensor and 32 times the resolution of the underlying bands of magnetic material 12.

In an embodiment of this invention, in addition to generating and controlling the lead output signal 110 and the trail output signal 112, the traditional quadrature output emulator 108 also produces a valid output signal 114. After the traditional quadrature output emulator 108 has finished toggling the lead output signal 110 and the trail output signal 112 for each sensing iteration, the traditional quadrature output emulator 108 raises the valid signal 114 to high and then returns the valid signal 114 back to zero. The valid signal 114 is used to indicate to decoding logic that the output signaling for the sensing iteration has finished.

In an embodiment of this invention, the traditional quadrature output emulator 108 is implemented in software within the MSP430 Mixed Signal Processor. However, one of ordinary skill in the art will appreciate that the traditional quadrature output emulator 108 could be implemented in a variety of different ways including as a separate external component.

Still other embodiments will become readily apparent to those skilled in this art from reading the above-recited detailed description and figures of certain exemplary embodiments. It should be understood that numerous variations, modifications, and additional embodiments are possible, and accordingly, all such variations, modifications, sizes, levels, and embodiments are to be regarded as being within the spirit and scope of this document. For example, the above-recited detailed description discloses both a method and system for acquiring two substantially sinusoidal signals in quadrature and a method and system for processing the two substantially sinusoidal signals. It will be appreciated by one of ordinary skill in the art that the method and system for processing two substantially sinusoidal signals disclosed in the above-recited detailed description is not limited to being used in conjunction with the method and system for acquiring two substantially sinusoidal signals in quadrature. That is, the method and system for processing two substantially sinusoidal signals disclosed could be applied to any sensor that generates input signals in quadrature. For instance, the method and system for processing two substantially sinusoidal signals disclosed could also be used in conjunction with optical rotary encoders.

The various embodiments of the present invention system and method may be utilized for a variety of substrates (e.g., rams, encoder wheels or the like), functions, purposes, methods and systems including as discussed in the following patents and publications listed below and of which are hereby incorporated by reference herein in their entirety:

U.S. Pat. No. 6,630,659 B1 to Stridsberg, entitled "Position Transducer";

U.S. Pat. No. 6,573,710 B1 to Santos et al., entitled "Position and/or Displacement Sensor Including a Plurality of Aligned Sensor Elements";

U.S. Pat. No. 6,556,153 B1 to Cardamone, entitled "System and Method for Improving Encoder Resolution";

U.S. Pat. No. 6,459,261 B1 to Luetzow et al., entitled "Magnetic Incremental Motion Detection System and Method";

U.S. Pat. No. 6,456,063 B1 to Moreno et al., entitled "Self Compensating Control Circuit for Digital Magnetic Sensors";

U.S. Pat. No. 6,294,910 B1 to Travostino et al., entitled "Digital Position Sensor for Sensing Position of a Moving Target";

U.S. Pat. No. 6,232,739 B1 to Krefta et al., entitled "High-Resolution Incremental Position Sensor With Pulse Switching Strategy";

U.S. Pat. No. 6,191,415 B1 to Stridsberg, entitled "Position Transducer";

U.S. Pat. No. 6,172,359 B1 to Stridsberg, entitled "Position Transducer";

U.S. Pat. No. 6,084,234 to Stridsberg, entitled "Position Transducer";

U.S. Pat. No. 5,719,789 to Kawamata, entitled "Method of and Apparatus for Detecting an Amount of Displacement";

U.S. Pat. No. 5,442,313 to Santos et al., entitled "Resolution Multiplying Circuit";

U.S. Pat. No. 5,067,089 to Ishii et al., entitled "Device Having Signal Interpolation Circuit and Displacement Measuring Apparatus Comprising the Device";

U.S. Pat. No. 5,041,784 to Griebeler, entitled "Magnetic Sensor With Rectangular Field Distorting Flux Bar";

U.S. Pat. No. 5,012,239 to Griebeler, entitled "High Resolution Position Sensor Circuit";

U.S. Pat. No. 4,972,080 to Taniguchi, entitled "Signal Processing Apparatus for Pulse Encoder With A/D Conversion and Clocking";

U.S. Pat. No. 4,630,928 to Klingler et al., entitled "Length Measuring Device";

U.S. Pat. No. 4,587,485 to Papiernik, entitled "Evaluation Arrangement for a Digital Incremental Transmitter";

U.S. Pat. No. 3,956,973 to Pomplas, entitled "Die Casting Machine With Piston Positioning Control;" and Z. Buckner, "Enhanced Resolution Quadrature Encoder Interface," master's thesis, Department of Electrical and Computer Engineering, University of Virginia, Charlottesville, 2004.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, section, abstract, drawing figure, etc.) of this application, unless clearly specified to the contrary, there is no requirement for any particular described or illustrated activity or element, any particular sequence of such activities, any particular size, speed, material, dimension, time period, or frequency, or any particular interrelationship of such elements. Moreover, any activity can be repeated, any activity can be performed by multiple entities, and/or any element can be duplicated Further, any activity or element can be excluded, the sequence of activities can vary, and/or the interrelationship of elements can vary. Accordingly, the descriptions and drawings are to be regarded as illustrative in nature, and not as restrictive.

The invention may be embodied in other specific forms without departing from the spirit or essential characteristics thereof. The foregoing embodiments are therefore to be considered in all respects illustrative rather than limiting of the invention described herein.

What is claimed is:

1. A system for detecting movement of a substrate, system comprising:
a first signal acquisition means for acquiring a first substantially sinusoidal signal related to the position of the substrate;
a second signal acquisition means for acquiring a second substantially sinusoidal signal related to the position of the substrate that is substantially 90 degrees out of phase with the first substantially sinusoidal signal;
a signal selection means for:
comparing the first substantially sinusoidal signal and the second substantially sinusoidal signal,
selecting the signal with the lesser instantaneous magnitude as the primary signal,
selecting the signal with the greater instantaneous magnitude as the secondary signal, and
producing a reference signal indicating whether the first substantially sinusoidal signal or the second substantially sinusoidal signal was selected as the primary signal;
a phase angle converter means for converting the primary signal into a phase angle signal; and
an angular movement detection means for:
determining angular movement over time based on the value of the phase angle signal over time, and
producing a corresponding angular movement signal.

2. The system of claim 1, wherein said phase angle converter means comprises:
a signal normalizing means for producing a normalized position signal by mapping the primary signal to a corresponding substantially sinusoidal signal with a known amplitude;
a phase angle lookup means for converting the normalized position signal into an uncorrected phase angle signal corresponding to the instantaneous phase angle of the normalized position signal; and
a phase translation means for producing a phase angle signal by correcting the phase angle signal based on the values of the secondary signal and the reference signal.

3. The system of claim 2, wherein said angular movement detection means comprises:
a phase register means for storing the corrected phase angle signal and outputting a previous iteration corrected phase angle signal equal to the corrected phase angle signal; and
a phase subtractor means for producing an uncorrected angular movement signal by subtracting the previous iteration corrected phase angle signal from the corrected phase angle signal.

4. The system claim 3, wherein said angular movement detection means further comprises:
an overflow corrector means for correcting the uncorrected angular movement signal in the ease of an overflow or underflow and producing the angular movement signal.

5. The system of claim 4, wherein:
said first signal acquisition means comprises a plurality of transducers; and
said second signal acquisition means comprises a plurality of transducers.

6. The system of claim 4 further comprising:
a traditional quadrature output emulating means for converting the angular movement signal into traditional quadrature output signals.

7. The system of claim 4, wherein said signal selection means is implemented in software in a digital controller.

8. The system of claim 7, wherein the digital controller is a MSP430 digital controller.

9. The system of claim 4, wherein said phase angle lookup means computes the instantaneous uncorrected phase angle of the normalized position signal using the formula:

uncorrected phase angle =

$$\left\lfloor \frac{\text{resolution}}{360°} \times \arccos\left(\frac{\text{normalized position signal}}{\text{know amplitude}}\right) \right\rfloor$$

where the value of "resolution" is a predefined constant and the value of "known amplitude" is a predefined constant.

10. The system of claim 4, wherein said phase angle lookup means computes the instantaneous phase angle of the normalized position signal using a lookup table.

11. The system of claim 10, wherein the resolution is 32.

12. The system of claim 4, wherein said phase angle lookup means is implemented in software in a digital controller.

13. The system of claim 12, wherein said digital controller is a MSP430 digital controller.

14. The system of claim 4, wherein, in the case where said signal selections means selects the first substantially sinusoidal signal as the primary signal, said phase translation means corrects the phase angle signal by:

performing no correction if the secondary output signal is greater than zero, or using the equation:

phase angle signal=resolution−1−uncorrected phase angle signal if the secondary signal is less than zero,
and where the value of resolution is a predefined constant.

15. The system of claim 14, wherein, in the case where said signal selections means selects the second substantially sinusoidal signal as the primary signal, said phase translation means corrects the phase angle signal by:
using the equation:

$$\text{phase angle signal} = \left(\text{uncorrected phase angle} + \frac{\text{resolution}}{4}\right) \% \text{ resolution}$$

if the secondary signal is less than zero, or
using the equation $$\text{phase angle signal} = \left((\text{resolution} - 1 - \text{uncorrected phase angle}) + \frac{\text{resolution}}{4}\right) \% \text{ resolution}$$

if the secondary signal is greater than zero,
and where the value of resolution is a predefined constant.

16. The system of claim 15, wherein the resolution is 32.

17. The system of claim 15, wherein said phase translation means is implemented in software in a digital controller.

18. The system of claim 17, wherein said digital controller is a MSP430 digital controller.

19. The system of claim 4, wherein said phase register means is implemented in software in a digital controller.

20. The system of claim 19, wherein said digital controller is a MSP430 digital controller.

21. The system of claim 4, wherein said phase subtractor means is implemented in software in a digital controller.

22. The system of claim 21, wherein said digital controller is a MSP430 digital controller.

23. The system of claim 4, wherein the overflow corrector means corrects the uncorrected angular movement output signal:

by using the equation:

angular movement=uncorrected angular movement−resolution, if uncorrected angular movement output signal>resolution/2;
by using the equation:

angular movement=uncorrected angular movement+resolution, if uncorrected angular movement output signal>−resolution/2; or
by using the equation:

angular movement=uncorrected angular movement, if resolution/2=uncorrected angular movement output signal=−resolution/2;
where the value of resolution is a predefined constant.

24. The system of claim 23, wherein the resolution is 32.

25. The system of claim 23, wherein said overflow corrector means is implemented in software in a digital controller.

26. The system of claim 25, wherein said digital controller is a MSP430 digital controller.

27. The system of claim 4, wherein said traditional quadrature output emulating means outputs at least three traditional quadrature output signals.

28. The of claim 27, wherein said traditional quadrature output means is represented by a simple finite state machine.

29. The system of claim 28, wherein said traditional quadrature output emulating means is implemented in software in a digital controller.

30. The system of claim 29, wherein said digital controller is a MSP430 digital controller.

31. The system of claim 4, wherein said first signal acquisition means comprises: a plurality of transducers including at least:

a first transducer, a second transducer, a third transducer, and a fourth transducer, wherein said at least one of said first transducer, said second transducer, said third transducer, and said fourth transducer is a Hall-effect sensor.

32. The system of claim 2, wherein the signal normalizing means:

computes the amplitude of the primary signal, and
maps the primary signal to a corresponding sinusoidal signal with known amplitude.

33. The system of claim 2, wherein said signal normalizing means computes the amplitude of the primary signal using the formula:

$$\text{amplitude} = \sqrt{p^2 + s^2}$$

where "p" represents the instantaneous magnitude of the primary signal and "s" represents the instantaneous magnitude of the secondary signal.

34. The system of claim 2, wherein said signal normalizing means determines the amplitude of the primary signal using a lookup table.

35. The system of claim 2, wherein said signal normalizing means maps the primary output signal to a corresponding sinusoidal signal with a known amplitude using the formula:

$$\text{normalized position signal} = \left\lfloor \frac{\text{known amplitude}}{\text{amplitude}} \times 2^{10} \right\rfloor \times p \times 2^{-10}.$$

36. The system for sensing position and/or displacement of a moving substrate of claim 35, wherein the known amplitude is 2048.

37. The system of claim 36, wherein said signal normalizing means is implemented in software in a digital controller.

38. The system of claim 37, wherein said digital controller is a MSP430 digital controller.

39. The system of claim 2, wherein said signal normalizing means computes:

$$\left\lfloor \frac{\text{known amplitude}}{\text{amplitude}} \times 2^{10} \right\rfloor$$

using a lookup table.

40. The system of claim 2, wherein said signal normalizing means executes a right shift operation to compute the $\times 2^{-10}$ operation.

41. The claim 1, wherein
  said substrate comprising a plurality of equally-spaced bands of magnetic material disposed circumferentially around the substrate;
  said first signal acquisition means comprises:
    a plurality of transducers including at least:
      a first transducer mounted proximately to the substrate such that when the substrate moves said plurality of bands of magnetic material disposed circumferentially around said the substrate pass said first transducer thereby generating a substantially sinusoidal first transducer output signal; and
      a second transducer mounted proximately to said substrate such that when the substrate moves said plurality of hands of magnetic material disposed circumferentially around said substrate pass said second transducer thereby generating a substantially sinusoidal second transducer output signal;
    wherein said first transducer and said second transducer are:
      positioned linearly with respect to each other, and spaced such that the distance between said first transducer and said second transducer is substantially equal to one-half of the distance between two adjacent bands of magnetic material disposed circumferentially around said substrate such that the substantially sinusoidal first transducer output signal is substantially 180 degrees out of phase with the substantially sinusoidal second transducer output signal; and
  said second signal acquisition means comprises:
    a plurality of transducers including at least:
      a third transducer mounted proximately to said substrate such that when said substrate moves said plurality of bands of magnetic material disposed circumferentially around said substrate pass said third transducer thereby generating a substantially sinusoidal third transducer output signal, and
      a fourth transducer mounted proximately to said substrate such that when said substrate moves said plurality of bands of magnetic material disposed circumferentially around said substrate pass said fourth transducer thereby generating a substantially sinusoidal fourth transducer output signal,
    wherein said third transducer and said fourth transducer are:
      positioned linearly with respect to each other as well as with respect to said first transducer and said second transducer such that said third transducer is located between said first transducer and said second transducer, and
      spaced such that:
        the distance between said third transducer and said fourth transducer is substantially equal to one-half of the distance between two adjacent bands of magnetic material disposed circumferentially around said substrate such that the substantially sinusoidal third transducer output signal is substantially 180 degrees out of phase with the substantially sinusoidal fourth transducer output signal,
        the distance between said third transducer and said first transducer is substantially equal to one-quarter of the distance between two adjacent bands of magnetic material disposed circumferentially around said substrate,
        the distance between said third transducer and said second transducer is substantially equal to one-quarter of the distance between two adjacent bands of magnetic material disposed circumferentially around said substrate,
        the distance between said fourth transducer and said first transducer is substantially equal to three-quarters of the distance between two adjacent bands of magnetic material disposed circumferentially around said substrate, and
        the distance between said fourth transducer and said second transducer is substantially equal to one-quarter of the distance between two adjacent bands of magnetic material disposed circumferentially around said substrate.

42. The system of claim 41, wherein:
  said first signal acquisition means further comprises:
    a first signal combining means for producing a first combined signal by subtracting the second transducer output signal from the first transducer output signal and amplifying the resulting signal,
    a first analog-to-digital converter for producing the first substantially sinusoidal signal related to the position of said substrate by converting a first calibrated signal into a digital signal,
    a first averaging means for producing a first digital error signal, by:
      performing a time-average of the first substantially sinusoidal signal related to the position of said substrate, and
      subtracting the time-average of the first substantially sinusoidal signal related to the position of said substrate from the value of the direct current offset required by the first analog-to-digital converter,
    a first digital-to-analog converter for converting the first digital error signal into a first analog error signal,
    a first subtractor means for producing the first calibrated signal by subtracting the first analog error signal from the first combined signal; and
  said second signal acquisition means further comprises:
    a second signal combining means for producing a second combined signal by subtracting the fourth transducer output signal from the third transducer output signal and amplifying the resulting signal,
    a second analog-to-digital converter for producing the second substantially sinusoidal signal related to the position of said substrate by converting a second calibrated signal into a corresponding digital signal, a second averaging means for producing a second digital error signal by:
  performing a time-average of the second substantially sinusoidal signal related to the position of said substrate, and
  subtracting the time-average of the second substantially sinusoidal signal related to the position of said substrate from the value of the direct current offset required by said second analog-to-digital converter,
a second digital-to-analog converter for converting the second digital error signal into a second analog error signal, and
a second subtractor means for producing the second calibrated signal by subtracting the second analog error signal from the second combined signal.

43. The system of claim 1, wherein:
said first signal acquisition means further comprises:
  a first signal combining means for producing the first substantially sinusoidal signal related to the position of said substrate by subtracting the second transducer output signal from the first transducer output signal and amplifying the resulting signal; and
said second signal acquisition means further comprises:
  a second signal combining means for producing the second substantially sinusoidal signal related to the position of said substrate by subtracting the fourth transducer output signal from the third transducer output signal and amplifying the resulting signal.

44. The system of claim 43, wherein:
said first signal combining means is a differential amplifier, and
said second signal combining means is a differential amplifier.

45. The system of claim 1, wherein:
said first signal acquisition means further comprises:
  a first signal combining means for producing a first combined signal by subtracting the second transducer output signal from the first transducer output signal and amplifying the resulting signal, and
  a first analog-to-digital converter for producing the first substantially sinusoidal signal related to the position of said substrate by converting the first combined signal into a corresponding digital signal; and
said second signal acquisition means further comprises:
  a second signal combining means for producing a second combined signal by subtracting the fourth transducer output signal from the third transducer output signal and amplifying the resulting signal; and
  a second analog-to-digital converter for producing the second substantially sinusoidal signal related to the position of said substrate by converting the second combined signal into a corresponding digital signal.

46. The system for sensing position and/or displacement of a moving substrate of claim 45, wherein:
said first signal combining means is a differential amplifier, and
said second signal combining means is a differential amplifier.

47. The system of claim 45, wherein:
said first signal combining means is a differential amplifier, and
said second signal combining means is a differential amplifier.

48. The system of claim 1, wherein said moving substrate comprises a ram, target, or piston.

49. The system of claim 1, said moving substrate comprising a plurality of equally-spaced bands of magnetic material disposed circumferentially around said substrate.

50. The system of claim 49, wherein said moving substrate comprises a ram, target or piston.

51. The system of claim 1, wherein said moving substrate comprises an optical encoder.

52. The system of claim 51, wherein said optical encoder comprises an encoder wheel.

53. The system of claim 52, wherein said optical encoder wheel comprises apertures wherein at least one of said first signal acquisition means and said second signal acquisition means comprises an optical detector.

54. The system of claim 53, wherein said optical detector comprises a photo diode.

55. A method for detecting movement of a moving substrate, comprising:
acquiring a first substantially sinusoidal signal related to the position of said substrate;
acquiring a second substantially sinusoidal signal related to the position of said substrate that is substantially 90 degrees out of phase with the first substantially sinusoidal signal;
comparing the first substantially sinusoidal signal and the second substantially sinusoidal signal, selecting the signal with the lesser instantaneous magnitude as the primary signal, selecting the signal with the greater instantaneous magnitude as the secondary signal, and producing a reference signal indicating whether the first substantially sinusoidal signal or the second substantially sinusoidal signal was selected as the primary signal;
converting the primary signal into a phase angle signal; and
determining angular movement over time and producing a corresponding angular movement signal.

56. The method of claim 55, wherein converting the primary signal into a phase angle signal comprises:
producing a normalized position signal by mapping the primary signal to a corresponding substantially sinusoidal signal with a known amplitude;
converting the normalized position signal into an uncorrected phase angle signal corresponding to the instantaneous phase angle of the normalized position signal; and
producing a phase angle signal by correcting the uncorrected phase angle signal based on the values of the secondary signal and the reference signal.

57. The method of claim 56, wherein determining angular movement over time and producing a corresponding angular movement output signal comprises:
storing the phase angle signal and outputting a previous iteration phase angle signal equal to the phase angle signal;
subtracting the previous iteration phase angle signal from the phase angle output signal and producing an uncorrected angular movement signal; and
producing the angular movement signal by correcting the uncorrected angular movement signal in the case of an overflow or underflow.

58. The method of claim 57, wherein:
said substrate comprising a plurality of equally-spaced bands of magnetic material disposed circumferentially around said substrate;
acquiring the first substantially sinusoidal signal related to the position of said substrate comprises using a plurality of transducers including at least:
  a first transducer mounted proximately to said substrate such that when said substrate moves said plurality of bands of magnetic material disposed circumferentially around said substrate pass said first transducer thereby generating a substantially sinusoidal first transducer output signal; and a second transducer mounted proximately to said substrate such that when said substrate moves said plurality of bands of magnetic material disposed circumferentially around said substrate pass said second transducer thereby generating a substantially sinusoidal second transducer output signal;

wherein said first transducer and said second transducer are:

positioned linearly with respect to each other and spaced such that the distance between said first transducer and said second transducer is substantially equal to one-half of the distance between two adjacent bands of magnetic material disposed circumferentially around said substrate such that the substantially sinusoidal first transducer output signal is substantially 180 degrees out of phase with the substantially sinusoidal second transducer output signal; and acquiring the second substantially sinusoidal signal related to the position of said substrate comprises using a plurality of transducers including at least:

a third transducer mounted proximately to said substrate such that when said substrate moves said plurality of bands of magnetic material disposed circumferentially around said substrate pass said third transducer thereby generating a substantially sinusoidal third transducer output signal, and a fourth transducer mounted proximately to said substrate such that when said substrate moves said plurality of bands of magnetic material disposed circumferentially around said substrate pass said fourth transducer thereby generating a substantially sinusoidal fourth transducer output signal, wherein said third transducer and said fourth transducer are:

positioned linearly with respect to each other as well as with respect to said first transducer and said second transducer such that said third transducer is located between said first transducer and said second transducer, and spaced such that:

the distance between said third transducer and said fourth transducer is substantially equal to one-half of the distance between two adjacent bands of magnetic material disposed circumferentially around said substrate such that the substantially sinusoidal third transducer output signal is substantially 180 degrees out of phase with the substantially sinusoidal fourth transducer output signal, the distance between said third transducer and said first transducer is substantially equal to one-quarter of the distance between two adjacent bands of magnetic material disposed circumferentially around said substrate, the distance between said third transducer and said second transducer is substantially equal to one-quarter of the distance between two adjacent bands of magnetic material disposed circumferentially around said substrate, the distance between said fourth transducer and said first transducer is substantially equal to three-quarters of the distance between two adjacent bands of magnetic material disposed circumferentially around said substrate, and the distance between said fourth transducer and said second transducer is substantially equal to one-quarter of the distance between two adjacent bands of magnetic material disposed circumferentially around said substrate.

59. The method of claim 58, wherein:

acquiring the first substantially sinusoidal signal related to the position of said substrate further comprises:

producing the first substantially sinusoidal signal related to the position of said substrate by subtracting the second transducer output signal from the first transducer output signal and amplifying the resulting signal; and acquiring the second substantially sinusoidal signal related to the position of said substrate further comprises:

producing the second substantially sinusoidal signal related to the position of said substrate by subtracting the fourth transducer output signal from the third transducer output signal and amplifying the resulting signal.

60. The method of claim 59, wherein:

subtracting the second transducer output signal from the first transducer output signal and amplifying the resulting signal is accomplished using a first differential amplifier, and subtracting the fourth transducer output signal from the third transducer output signal and amplifying the resulting signal is accomplished using a second differential amplifier.

61. The method of claim 58, wherein:

acquiring the first substantially sinusoidal signal related to the position of said substrate further comprises:

producing a first combined signal by subtracting the second transducer output signal from the first transducer output signal and amplifying the resulting signal, and producing the first substantially sinusoidal signal related to the position of said substrate by converting the first combined signal into a corresponding digital signal; and acquiring the second substantially sinusoidal signal related to the position of said substrate further comprises producing a second combined signal by subtracting the fourth transducer output signal from the third transducer output signal and amplifying the resulting signal; and producing the second substantially sinusoidal signal related to the position of said substrate by converting the second combined signal into a corresponding digital signal.

62. The method of claim 61, wherein:

subtracting the second transducer output signal from the first transducer output signal and amplifying the resulting signal is accomplished using a first differential amplifier, and subtracting the fourth transducer output signal from the third transducer output signal and amplifying the resulting signal is accomplished using a second differential amplifier.

63. The method of claim 58, wherein:

acquiring the first substantially sinusoidal signal related to the position of said substrate comprises:

producing a first combined signal by subtracting the second transducer output signal from the first transducer output signal and amplifying the resulting signal, producing a first digital error output signal, converting the first digital error output signal into a first analog error signal, producing a first calibrated signal by subtracting the first analog error signal from the first combined signal, and producing the first substantially sinusoidal signal related to the position of said substrate by converting the first calibrated signal into a corresponding digital signal; and acquiring the second substantially sinusoidal signal related to the position of said substrate comprises producing a second combined signal by subtracting the fourth transducer output signal from the third transducer output signal and amplifying the resulting signal, producing a second digital error output signal, converting the second digital error output signal into a second analog error signal, producing a second calibrated signal by subtracting the second analog error signal from the second combined signal, and producing the second substantially sinusoidal signal related to the position of said substrate by converting the second calibrated signal into a corresponding digital signal.

64. The method of claim 63, wherein:

producing the first digital error signal comprises:

performing a time-average of the first substantially sinusoidal signal related to the position of said substrate and subtracting it from the value of the direct current offset required by said first analog-to-digital converter; and producing the second digital error signal comprises:

performing a time-average of the second substantially sinusoidal signal related to the position of said substrate and subtracting it from the value of the direct current offset required by said second analog-to-digital converter.

65. The method of claim 58, wherein:

subtracting the second transducer output signal from the first transducer output signal and amplifying the resulting signal is accomplished using a first differential amplifier, and subtracting the fourth transducer output signal from the third transducer output signal and amplifying the resulting signal is accomplished using a second differential amplifier.

66. The method of claim 58, wherein said digital controller is a MSP430 digital controller.

67. The method of claim 57, wherein comparing the first substantially sinusoidal signal and the second substantially sinusoidal signal, selecting the signal with the lesser instantaneous magnitude as the primary signal, selecting the signal with the greater instantaneous magnitude as the secondary signal, and producing a reference signal is implemented in software in a digital controller.

68. The method of claim 67, wherein said digital controller is a MSP430 digital controller.

69. The method of claim 57, wherein storing the phase angle signal and outputting a previous iteration phase angle signal equal to the phase angle signal is implemented in software in a digital controller.

70. The method of claim 69, wherein said digital controller is a MSP430 digital controller.

71. The method of claim 57, wherein subtracting the previous iteration phase angle signal from the phase angle signal and producing an uncorrected angular movement signal is implemented in software in a digital controller.

72. The method of claim 71, wherein said digital controller is a MSP430 digital controller.

73. The method of claim 72, wherein the resolution is 32.

74. The method of claim 72, wherein correcting the uncorrected angular movement output signal is implemented in software in a digital controller.

75. The method of claim 74, wherein said digital controller is a MSP430 digital controller.

76. The method of claim 56, wherein producing a normalized position signal by mapping the primary signal to a corresponding substantially sinusoidal signal with a known amplitude comprises:

computing the amplitude of the primary signal, and mapping the primary signal to a corresponding sinusoidal signal with known amplitude.

77. The method of claim 76, wherein computing the amplitude of the primary signal is accomplished using the formula:

$$\text{amplitude} = \sqrt{p^2 + s^2}$$

where "p" represents the instantaneous magnitude of the primary signal and "s" represents the instantaneous magnitude of the secondary signal.

78. The method of claim 76, wherein determining the amplitude of the primary signal is accomplished using a lookup table.

79. The method claim 76, wherein mapping the primary signal to a corresponding sinusoidal signal with a known amplitude is accomplished using the formula:

$$\text{normalized position signal} = \left\lfloor \frac{\text{known amplitude}}{\text{amplitude}} \times 2^{10} \right\rfloor \times p \times 2^{-10}.$$

80. The method of claim 79, wherein computing:

$$\left\lfloor \frac{\text{known amplitude}}{\text{amplitude}} \times 2^{10} \right\rfloor$$

is accomplished using a lookup table.

81. The method of claim 80, wherein computing the $\times 2^{-10}$ operation is accomplished by using a right shift operation.

82. The method of claim 81, wherein the known amplitude is 2048.

83. The method of claim 76, wherein producing a normalized position signal by mapping the primary signal to a corresponding substantially sinusoidal signal with a known amplitude is implemented in software in a digital controller.

84. The method of claim 56, wherein computing the instantaneous uncorrected phase angle of the normalized position signal is accomplished using the formula:

uncorrected phase angle =

$$\left\lfloor \frac{\text{resolution}}{360°} \times \arccos\left( \frac{\text{normalized position signal}}{\text{know amplitude}} \right) \right\rfloor$$

where the value of "resolution" is a predefined constant and the value of "known amplitude" is a predefined constant.

85. The method of claim 56, wherein computing the instantaneous uncorrected phase angle of the normalized position signal is accomplished using a lookup table.

86. The method of claim 85, wherein the resolution is 32.

87. The method of claim 56, wherein computing the instantaneous uncorrected phase angle of the normalized position signal is implemented in software in a digital controller.

88. The method of claim 87, wherein said digital controller is a MSP430 digital controller.

89. The method of claim 56, wherein, in the case where the first substantially sinusoidal signal is selected as the primary signal, correcting the uncorrected phase angle signal comprises:
performing no correction if the secondary output signal is greater than zero, or using the equation:

phase angle signal=resolution−1−uncorrected phase angle signal if the secondary output signal is less than zero,
and where there value of resolution is a predefined constant.

90. The method of claim 89, wherein, in the case where the second substantially sinusoidal signal is selected as the primary signal, correcting the uncorrected phase angle signal comprises:
using the equation:

$$\text{phase angle signal} = \left(\text{uncorrected phase angle} + \frac{\text{resolution}}{4}\right) \% \text{ resolution}$$

if the secondary output signal is less than zero, or
using the equation:

$$\text{phase angle signal} = \left((\text{resolution}-1-\text{uncorrected phase angle}) + \frac{\text{resolution}}{4}\right) \% \text{ resolution}$$

if the secondary output signal is greater than zero,
and where the value of resolution is a predefined constant.

91. The method of claim 90, wherein the resolution is 32.

92. The method of claim 90, wherein correcting the uncorrected phase angle signal is implemented in software in a digital controller.

93. The method of claim 92, wherein said digital controller is a MSP430 digital controller.

94. The method of claim 56, wherein correcting the uncorrected angular movement signal comprises:
using the equation:

angular movement=uncorrected angular movement−resolution if uncorrected angular movement signal>resolution/2;
using the equation:

angular movement=uncorrected angular movement+resolution if uncorrected angular movement output signal>−resolution/2; or
using the equation:

angular movement=uncorrected angular movement if resolution/2=uncorrected angular movement=−resolution/2;
where the value of resolution is a predefined constant.

95. The method of claim 56, wherein at least one of said first transducer, second transducer, third transducer, and fourth transducer is a Hall-effect sensor.

96. The method of claim 55 further comprising:
converting the angular movement signal into a plurality of traditional quadrature output signals.

97. The method of claim 96, wherein converting the angular movement signal into a plurality of traditional quadrature output signals comprises outputting at least three traditional quadrature output signals.

98. The method of claim 97, wherein the plurality of traditional quadrature output means is represented by a simple finite state machine.

99. The method of claim 98, wherein said simple finite state machine is implemented in software in a digital controller.

100. The method of claim 99, wherein said digital controller is a MSP430 digital controller.

101. The method of claim 55, wherein said moving substrate comprises a ram, target, or piston.

102. The method of claim 55, said moving substrate comprising a plurality of equally-spaced bands of magnetic material disposed circumferentially around said substrate.

103. The method of claim 102, wherein said moving substrate comprises a target, ram or piston.

104. The method of claim 55, wherein said moving substrate comprises an optical encoder.

105. The method of claim 104, wherein said optical encoder comprises an encoder wheel.

106. The method of claim 105, wherein said optical encoder wheel comprises apertures and wherein:
said acquiring said first substantially sinusoidal signal comprises optically detecting and/or
said acquiring second substantially sinusoidal signal acquisition comprises optically detecting.

107. The method of claim 106, wherein said optical detection is performed by an optical detector.

108. The method of claim 107, wherein said optical detector comprises a photo diode.

* * * * *